United States Patent Office 2,758,104
Patented Aug. 7, 1956

2,758,104

POLYVINYL CHLORIDE DISSOLVED IN MIXTURES OF A CYCLIC ETHER AND AN AMIDE

Robert L. Adelman, Grand Island, N. Y., assignor to E. I. du Pont de Nemours and Company, Wilmington, Del., a corporation of Delaware No Drawing. Application November 13, 1951, Serial No. 256,130

11 Claims. (Cl. 260—30.4)

This invention relates to useful liquid dispersions or solutions of polyvinyl chloride.

High molecular weight (high viscosity) vinyl chloride homopolymers have found use as protective coatings, for coated paper and fabrics, and as unsupported films and sheeting. Among their advantageous properties is high chemical resistance to strong acids, alkalis, and most organic solvents. On the other hand, the insolubility of polyvinyl chloride in organic solvents leads to difficulties in formulation and application, and as a result solutions of these resins are used to only a limited extent. Cyclohexanone has been commonly used as a solvent for vinyl chloride polymers and copolymers but with many high molecular weight homopolymers, only solutions of low solids concentration can be formed. The rate of solution at room temperatures often is prohibitively slow, and many hours of vigorous stirring are required to obtain a solution of 10% resin concentration. It is therefore necessary to supply heating equipment to make the use of this solvent feasible. Because of the low solids content, a number of coats are often found necessary. Furthermore, the undesirable odor of cyclohexanone is very persistent in the cast films.

Methyl ethyl ketone is another commonly used solvent for polyvinyl chloride, but 10% solutions must be prepared by heating, and also applied when hot, for these solutions gel on cooling to room temperature. Other simple ketones and various proposed solvent mixtures have characteristics similar to cyclohexanone and methyl ethyl ketone for this application.

Tetrahydrofuran will dissolve several of the commercially available grades of polyvinyl chloride, particularly the medium or low molecular weight grades, at concentrations below 10% of resin solids to give low viscosity solutions with no "grain." Thick films cast from solutions as dilute as 10% solids often have considerable "orange peel." At higher concentrations of resin solids, which are more desirable from an economic point of view, grainy solutions or gels generally result, which give non-glossy and grainy films on casting. At resin concentrations of 12–20%, there are very few commercially available high molecular weight polyvinyl chloride resins which will give clear, non-viscous solutions of polyvinyl chloride in tetrahydrofuran at temperatures of 10 to 30° C.

N,N-dimethyl formamide is known to be a good solvent for polyacrylonitrile, and N,N-dimethyl acetamide a good solvent for polyvinylidene chloride, yet dimethyl formamide or dimethyl acetamide are poor solvents for polyvinyl chloride.

One of the objects of this invention is to provide clear, non-viscous solutions or dispersions containing the polymer of vinyl chloride. Another object is to prepare such solutions of polymers of vinyl chloride at temperatures of 10 to 30° C. Another object is to provide such solutions of polymers of pure polyvinyl chloride in which the resin concentration is 10% or greater, from which films of good quality can be cast. Another object is to provide solutions or dispersions containing the copolymers of vinyl chloride with copolymerizable monomers containing one active ethylenic group. Other objects will be apparent from the following description of the invention.

In accordance with the present invention, novel and useful resin solutions are prepared by dissolving polyvinyl chloride in solvent mixtures comprising (A) about 0.6 to 19 parts by volume of a cyclic ether hereinafter described and (B) one part of an organic amido compound having the group R—CO—N<, where R is hydrogen or methyl, the nitrogen atom of which is attached to three carbon atoms (i. e., to 2 carbon atoms in addition to the carbonyl radical).

Suitable cyclic ethers are tetramethylene oxide (tetrahydrofuran), pentamethylene oxide (tetrahydropyran) and their alkyl and alkoxy derivatives, particularly the methyl and methoxy derivatives of tetrahydrofuran. Examples of suitable organic amido compounds having the group R—CO—N< fall into two categories (1) the N-dialkyl derivatives of formic and acetic acids, having 1 to 2 carbon atoms in the N-alkyl groups and (2) N-acyl derivatives of saturated heterocyclic nitrogen compounds, the acyl groups having 1 to 2 carbon atoms, e. g., the N-formyl and N-acetyl derivatives of pyrrolidine, morpholine, piperidine and their homologs. The amido compound selected should exist in the liquid state in solution when mixed with the cyclic ether, preferably at a temperature of 10 to 30° C.

It has been found that the solvent power of the above described mixtures generally at least equals that of the cyclic ether component and usually exceeds that of either component. The synergistic effect is pronounced, for example, in mixtures of tetrahydrofuran with dimethyl formamide, dimethyl acetamide, N-formyl pyrrolidine and N-acetyl pyrrolidine. Certain other solvents may be added to the binary mixtures in amounts up to about 50% by volume of the total mixture, with little or no change in solvent power, for example, carbon disulfide, alkylene oxides (epoxides), ketones and esters. For example, particularly good results have been obtained with ternary mixtures containing tetrahydrofuran, carbon disulfide and N-dialkyl amides.

The following examples illustrate the invention. In these examples, the following trade names identify commercial grades of polyvinyl chlorides:

| Trade Name | Manufacturer |
| --- | --- |
| "Geon #101" | B. F. Goodrich Co. |
| "Marvinol VR-20" | U. S. Rubber Co. |
| "Marvinol VR-10" | U. S. Rubber Co. |
| "Vinylite QYNA" | Carbide and Carbon Chemicals Corp. |
| "Ultron 300" | Monsanto Chemical Co. |
| "Exon 900" | Firestone Plastics Co. |

Example 1

5 gms. of "Geon #101" (a high viscosity polyvinyl chloride substantially insoluble in acetone at 10–30° C.) was added to 45 gms. of dimethyl formamide with stirring at 25–30° C. An extremely grainy mixture with a viscosity of about 100 poises resulted. The mixture failed to form a clear, coherent film on drying at room temperature, but instead formed a fragile, opaque deposit.

Example 2

1 gm. of "Geon #101" was added, with shaking, at 25°–30° C. to 10 mls. of tetrahydropyran. No swelling of the polymer particles or significant degree of solution occurred for several hours. After 24 hours, the polymer was mostly undissolved, with a small amount of gel being present.

Example 3

7.5 gms. of "Geon #101" was added to 42.5 gms. of a mixture of 25 mls. of dimethyl formamide and 25 mls. of tetrahydropyran, with stirring at 25°–30° C. The polymer completely dissolved within one minute to give a clear, colorless solution containing no grain, and with a viscosity of 7.5 to 8.0 poises. A film cast upon glass was glossy, colorless, without grain, and without odor after 48 hours at 30° C.

Example 4

7.5 gms. of "Geon #101" was added to 42.5 gms. of tetrahydrofuran, with stirring, at 25°–30° C. The polymer was rapidly dispersed within one minute to give a grainy solution of 18–27 poise viscosity. Films cast from the solution had low gloss and were grainy.

Example 5

7.5 gms. of "Geon #101" was added, with stirring at 25°–30° C., to 42.5 gms. of a mixture of 70 mls. tetrahydrofuran and 30 mls. dimethyl formamide. The polymer dissolved within 1 minute to give a clear, colorless solution with no grain, and with a viscosity of 5.8 poises. Films cast from this solution were clear, glossy, colorless, and without grain.

Example 6

10 gms. of "Marvinol VR–20" (a low-medium viscosity polyvinyl chloride) was dispersed with stirring at 25°–30° C., in 40 gms. of tetrahydrofuran. A viscous, grainy solution resulted within 2 minutes, with an approximate viscosity of 95 poises.

Example 7

10 gms. of "Marvinol VR–20" was added, with stirring at 25°–30° C., to 40 gms. of a mixture of 65 mls. tetrahydrofuran and 35 mls. dimethyl formamide. The polymer dissolved within one minute to form a clear, colorless, solution with no grain, with a viscosity of 13 poises.

Example 8

7.5 gms. of "Vinylite QYNA" (a high viscosity polyvinyl chloride) was added, with stirring at 25°–30° C., to 42.5 gms. of tetrahydrofuran. A very grainy mixture was formed, with interspersed gel particles. The viscosity was in the neighborhood of 40 poises and the mixture finally gelled on standing. Cast films were very irregular in character.

Example 9

7.5 gms. of "Vinylite QYNA" was added, with stirring at 25°–30° C., to 42.5 gms. of a mixture of 65 mls. tetrahydrofuran and 35 mls. dimethyl formamide. A clear, colorless solution with no grain resulted within 1 minute stirring and 10 minutes standing at 30° C. The solution had a viscosity of 5.5 poises. Films cast from this solution had good gloss and no grain.

Example 10

7.5 gms. of "Geon #101" was added, with stirring at 25°–30° C., to 42.5 gms. of a mixture of 65 mls. tetrahydrofuran and 35 mls. dimethyl acetamide. The polymer dissolved within one minute to give a clear, colorless solution with no grain, and a viscosity of 10.5 poises.

Example 11

The procedure of Example 10 was repeated, except that diethyl formamide was substituted for dimethyl acetamide. The resulting solution was clear, colorless, with no grain, and a viscosity of 10.5 poises.

Example 12

7.5 gms. of "Geon #101" was added, with stirring at +25°–+30° C., to 42.5 gms. of a mixture of 35 mls. of tetrahydrofuran, 15 mls. of dimethyl formamide, and 50 mls. of propylene oxide. The polymer dissolved in less than one minute to form a solution which was colorless, low viscosity, (9.8 poises), and had less grain and more gloss in a film cast therefrom, than when using tetrahydrofuran alone as solvent at the same resin concentration.

Similar improved results were obtained with mixtures of tetrahydrofuran, dimethyl formamide and propylene oxide in 33/33/33, and 60/20/20 ratios.

Example 13

The solvent action of tetrahydrofuran and a mixture of 65 parts by volume of tetrahydrofuran with 35 parts by volume of dimethyl formamide was tested by stirring portions of the solvents at a temperature of 25 to 30° C., with the following high molecular weight polyvinyl chloride resins: "Marvinol VR–10," "Ultron 300" and "Exon 900." In each case the proportion of solvent was equivalent to a 15% by weight solution of the resin. Each of these resins readily dissolved in the mixture of tetrahydrofuran and dimethyl formamide. Two of the resins formed a gel, rather than a mobile solution, when mixed with tetrahydrofuran alone. The viscosities of the 15% solutions at 25° C. are tabulated below.

| Resin | Viscosity of Solution In Tetrahydrofuran Alone | Viscosity of Solution In Mixture of Tetrahydrofuran and Dimethyl Formamide |
|---|---|---|
| | | Poises |
| "Marvinol VR–10" | (Gel) | 23.0 |
| "Ultron 300" | (Gel) | 4.7 |
| "Exon 900" | 20 to 36 poises | 6.3 |

Example 14

Portions of "Geon #101" polyvinyl chloride was mixed at a temperature of 25 to 30° C. with the solvents indicated and the viscosity of resulting solutions was determined, with the following results (all parts are by volume).

| Solvent | Percent Solids In Solution | Viscosity of Solution |
|---|---|---|
| Mixture: 65 parts tetrahydrofuran and 35 parts N-formyl pyrrolidine | 10 | Poises 2.0 |
| Mixture: 65 parts tetrahydrofuran and 35 parts N-acetyl pyrrolidine | 10 | 2.0 |
| Mixture: 65 parts tetrahydrofuran and 35 parts N-acetyl morpholine | 10 | 3.4 |
| Tetrahydropyran | (¹) | (¹) |
| Mixture: 50 parts tetrahydropyran and 50 parts dimethyl formamide | 15 | 8 |
| 2-Methyl tetrahydrofuran | (¹) | (¹) |
| Mixture: 50 parts 2-methyl tetrahydrofuran and 50 parts dimethyl formamide | 15 | 7 |
| 2,2,5,5-tetramethyl tetrahydrofuran | (¹) | (¹) |
| Mixture: 25 parts 2,2,5,5-tetramethyl tetrahydrofuran and 75 parts dimethyl formamide | 10 | 2.3 |
| Mixture: 35 parts 2,5-dimethyl-2,5-diethyl tetrahydrofuran and 65 parts dimethyl formamide | 10 | 2.8 |
| Mixture: 75 parts methyl tetrahydrofurfuryl ether and 25 parts dimethyl formamide | 10 | 4.5 |

¹ Substantially not dissolved.

Example 15

5 gms. of "Geon #101" was added, with stirring at 25° C., to 45 gms. of a mixture of 33 mls. tetrahydrofuran, 33 mls. dimethyl formamide, and 33 mls. carbon disulfide. The resin dissolved within 30 seconds to give a clear solution with no grain and viscosity below 1.5 poises. Films were good, with a trace of orange peel. Similarly, 7.5 gms. of "Geon #101" was added to 42.5 gms. of the above solvent mixture with stirring at 25° C. Complete solution resulted within 1 minute to give clear, non-grainy solutions of 9–11 poises. Films cast from this 15% solution had high gloss, little or no grain, and no orange peel.

Example 16

5 gms. of "Geon #101" was added, with stirring at 25° C., to 45 gms. of a mixture of 35 mls. tetrahydrofuran, 15 mls. dimethyl formamide, 25 mls. acetone, and 25 mls. carbon disulfide. Solution occurred within one minute to give a clear, almost colorless, solution with no grain, and a viscosity of 1.8 poises. Films cast from this solution had no grain and high gloss, but considerable orange peel. Similar results are obtained by substituting methyl ethyl ketone for the acetone.

Example 17

7.5 gms. of "Geon #101" was added, with stirring at 25° C., to 42.5 gms. of a mixture of 40 mls. tetrahydrofuran, 20 mls. dimethyl formamide, 20 mls. acetone, 20 mls. carbon disulfide. Solutions resulted within 1 minute which had a slight amount of grain and a viscosity of 9–13 poises. Films cast from the solutions had fair gloss, some grain, and no orange peel.

Example 18

"Geon-101" was stirred at 25 to 30° C. with a mixture of:

| | | |
|---|---|---|
| Tetrahydrofuran | volumes | 40 |
| Dimethyl formamide | do | 20 |
| Carbon disulfide | do | 20 |
| Propylene oxide | do | 20 |

The resin dissolved readily in the solvent mixture and solutions containing 10% and 15% by weight of the resin were thus prepared. The viscosities of the solutions at 25° C. were:

| | | |
|---|---|---|
| 10% Solution | poises | 1.3 |
| 15% Solution | do | 12.0 |

Films cast from these solutions were of good quality.

The relative proportions of the cyclic ether compound and the amido compound component may vary within the range of from about 0.6 to 19 parts by volume of the cyclic ether to one part by volume of the amido compound. Generally, the best results are obtained within the range of about 1.5 to 3 parts of the cyclic ether to one of the amido compound. The preferred cyclic ether is tetrahydrofuran; its preference is based upon both its relative cheapness and availability and its superior solvent power.

Examples of suitable amido compounds all of which are liquids are:

Dimethyl formamide
Methyl ethyl formamide
Dimethyl acetamide
Diethyl formamide
N-Formyl pyrrolidine
N-Acetyl pyrrolidine
N-Acetyl morpholine If desired, solvent compositions in accordance with this invention may comprise mixtures of a plurality of either or both of the cyclic ethers or the amido compounds described herein.

The preferred amido compound is dimethyl formamide and the preferred compositions are the binary mixtures of about 1.5 to 3 parts by volume of tetrahydrofuran with one part of dimethyl formamide and ternary mixtures made by adding carbon disulfide to those binary mixtures. While tetrahydrofuran is a good solvent for acetone-insoluble grades of polyvinyl chloride, and dimethyl formamide is not satisfactory for such polyvinyl chlorides, the herein described mixtures of tetrahydrofuran and dimethyl formamide are better solvents for such polyvinyl chloride than is tetrahydrofuran alone.

In the ternary mixtures of tetrahydrofuran, dimethyl formamide and carbon disulfide, the carbon disulfide content may vary from a trace amount up to about 50% by volume of the ternary mixture. Preferably, the carbon disulfide content of the ternary mixture will lie within the range of about 10 to 33% by volume. Similar useful ternary solvent mixtures may be made containing carbon disulfide mixed with the other cyclic ethers and amido compounds described herein, in place of the tetrahydrofuran or the dimethyl formamide.

Quaternary solvent mixtures may be prepared in accordance with the present invention by adding an alkylene oxide (e. g., propylene oxide) or a ketone (e. g., acetone or methyl ethyl ketone) to the above described ternary mixtures. In such mixtures, the combined amount of carbon disulfide and the fourth component (oxide or ketone) may be from a trace amount up to about 50% by volume of the quaternary mixture, but preferably will lie in the range of about 10 to 33%.

The herein described solutions of polyvinyl chloride are useful as coating and impregnating compositions for a great variety of applications and for spinning polyvinyl chloride fibers and filaments. The preparation of solvent mixtures as herein described gives greater latitude of choice of solvents for the solution manufacturer, enabling him to select the cheapest and most available of these solvent mixture components to produce solutions of high quality. The invention makes possible solvent mixtures having greater solvent power for polyvinyl chloride than that obtainable with previously known solvents. This permits the manufacturer on application, at temperatures of 10 to 30° C., of solutions of higher solids content and lower viscosity, to obtain films of high quality.

I claim:

1. A composition of matter comprising a solution of a high molecular weight homopolymer of vinyl chloride in a liquid mixture of 0.6 to 19 parts by volume of tetrahydrofuran with one part by volume of a dialkyl formamide.

2. A composition of matter comprising a solution of a high molecular weight homopolymer of vinyl chloride in a mixture of about 1.5 to 3 parts by volume of tetrahydrofuran with one part by volume of dimethyl formamide.

3. A composition of matter comprising a liquid solution of a high molecular weight homopolymer of vinyl chloride in a mixture of about 1. 5 to 3 parts by volume of tetrahydrofuran with one part by volume of dimethyl formamide and one of the group consisting of carbon disulfide, propylene oxide and methyl ethyl ketone not to exceed 50% by volume of the mixture.

4. A composition of matter comprising a liquid solution of a high molecular weight homopolymer of vinyl chloride in a quaternary mixture of about 1.5 to 3 parts by volume of tetrahydrofuran with one part by volume of dimethyl formamide and carbon disulfide and methyl ethyl ketone, the last two components of the quaternary mixture not to exceed 50% by volume of said mixture.

5. A liquid solution of a high molecular weight homopolymer of vinyl chloride in a solvent mixture of tetrahydrofuran, dimethyl formamide and carbon disulfide in the proportions of 1.5 to 3 parts by volume of tetrahydrofuran to one part of dimethyl formamide and carbon disulfide not to exceed about 50% by volume of the mixture.

6. A liquid solution of a high molecular weight homopolymer of vinyl chloride in a solvent mixture of tetrahydrofuran, dimethyl formamide and propylene oxide in the proportions of 1.5 to 3 parts by volume of tetrahydrofuran to one part of dimethyl formamide and propylene oxide not to exceed about 50% by volume of the mixture.

7. A liquid solution of a high molecular weight homopolymer of vinyl chloride in a solvent mixture of tetrahydrofuran, dimethyl formamide and methyl ethyl ketone in the proportions of 1.5 to 3 parts by volume of tetrahydrofuran to one part of dimethyl formamide and methyl ethyl ketone not to exceed about 50% by volume of the mixture.

8. A liquid solution of a high molecular weight homopolymer of vinyl chloride in a solvent mixture of tetrahydrofuran, dimethyl formamide and carbon disulfide and acetone in the proportions of 1.5 to 3 parts by volume of tetrahydrofuran to one part of dimethyl formamide and the combined volumes of carbon disulfide and acetone not to exceed about 50% by volume of the mixture.

9. A composition of matter comprising a liquid solution of a high molecular weight homopolymer of vinyl chloride in a quaternary mixture of about 1.5 to 3 parts by volume of tetrahydrofuran with one part by volume of dimethyl formamide and carbon disulfide and propylene oxide, the last two components of the quaternary mixture not to exceed 50% by volume of said mixture.

10. A composition of matter comprising a solution of a high molecular weight homopolymer of vinyl chloride in a liquid solvent mixture containing 0.6 to 19 parts by volume of a cyclic ether selected from the group consisting of tetrahydrofuran, tetrahydropyran and the alkyl and alkoxy substituted tetrahydrofurans and tetrahydropyrans and one part by volume of dimethyl formamide.

11. A composition of matter comprising a solution of a high molecular weight homopolymer of vinyl chloride in a liquid solvent mixture containing 0.6 to 19 parts by volume of a cyclic ether selected from the group consisting of tetrahydrofuran, tetrahydropyran and the alkyl and alkoxy substituted tetrahydrofurans and tetrahydropyrans and one part by volume of N-formyl pyrrolidine.

References Cited in the file of this patent

UNITED STATES PATENTS

| | | |
|---|---|---|
| 2,255,229 | Reppe | Sept. 9, 1941 |
| 2,529,449 | Ham | Nov. 7, 1950 |

OTHER REFERENCES

"Dimethyl Formamide" Product Information, Bulletin A-359, publication of E. I. du Pont de Nemours and Company, Wilmington, Delaware, p. 4, December 1949.

Chemical and Engineering News, vol. 7, No. 49, Dec. 5, 1949, p. 3615.